United States Patent [19]
Wamprecht et al.

[11] Patent Number: 5,910,556
[45] Date of Patent: Jun. 8, 1999

[54] DISPERSING AGENTS FOR AQUEOUS COATINGS COMPOSITIONS

[75] Inventors: Christian Wamprecht, Neuss; Oswald Wilmes, Köln; Stephan Kirchmeyer, Leverkusen; Jan Mazanek, Köln, all of Germany

[73] Assignee: Bayer Aktiengesellschaft, Leverkusen, Germany

[21] Appl. No.: 08/915,184

[22] Filed: Aug. 20, 1997

[30] Foreign Application Priority Data

Aug. 30, 1996 [DE] Germany .................. 196 35 065

[51] Int. Cl.$^6$ .................................... C08G 18/48
[52] U.S. Cl. .................. 528/49; 252/351; 544/222; 560/26; 560/115; 560/157
[58] Field of Search ............... 528/49; 252/351; 544/222; 560/26, 115, 157

[56] References Cited

U.S. PATENT DOCUMENTS

| | | | |
|---|---|---|---|
| 4,131,603 | 12/1978 | Perry et al. .................. | 528/45 |
| 4,647,647 | 3/1987 | Haubennestel et al. .......... | 528/83 |
| 4,732,618 | 3/1988 | Spietschka et al. ............ | 106/288 Q |
| 4,929,705 | 5/1990 | Mazanek et al. .............. | 528/49 |
| 5,672,673 | 9/1997 | Kirchmeyer et al. ........... | 528/49 |

*Primary Examiner*—Rachel Gorr
*Attorney, Agent, or Firm*—Joseph C. Gil; Diderico van Eyl; Thomas W. Roy

[57] ABSTRACT

The present invention relates to a process for the solvent-free production of polyisocyanate addition products, which are suitable as dispersing agents for incorporating solids into aqueous coating compositions, wherein the polyisocyanate addition products have a maximum content of 1% by weight of isocyanate groups and a content of 30 to 95% by weight of ethylene oxide units (molecular weight=44) present in the polyether chains of monofunctional alcohols B), and are prepared by reacting A) a polyisocyanate component having an average NCO functionality of 1.7 to 2.5 and an NCO content of 10 to 65% by weight with one or more of the following components:

B) monohydric polyether alcohols having a number average molecular weight of 150 to 5000 and an ethylene oxide content of 40 to 99.5% by weight, C) monohydric alcohols having a number average molecular weight of 32 to 5000, which are different from the alcohols of component B), D) an amine component which contains at least one tertiary amine having a molecular weight of 88 to 250 and which contains one isocyanate-reactive group and E) compounds having a number average molecular weight of 32 to 5000 and at least two isocyanate-reactive groups, The present invention also relates to the polyisocyanate addition products obtained by this process and to their use as dispersing agents incorporating solids into aqueous and/or solvent-containing coating compositions.

3 Claims, No Drawings

DISPERSING AGENTS FOR AQUEOUS COATINGS COMPOSITIONS

BACKGROUND OF THE INVENTION

1. Field of the Invention

The present invention relates to new, water soluble polyisocyanate addition products, to a process for their preparation and to their use as dispersing agents for incorporating solids into aqueous lacquers or coating compositions.

2. Description of the Prior Art

High mechanical forces are necessary to incorporate solids into liquid media. This depends to a large extent on the wettability of the solid by the surrounding medium and on its affinity for this medium. In order to reduce these dispersion forces, it is customary to employ dispersing agents which facilitate incorporation. These are primarily surface-active agents (surfactants) having an anionic, cationic or nonionic structure. These substances are either deposited directly on the solid or are added to the dispersing medium, in relatively small amounts in each case. The dispersion energy is significantly reduced by these surfactants.

It is also known that these solids tend to agglomerate again after dispersion, which nullifies the dispersion energy expended previously and results in serious problems. This phenomenon is explained by London/van der Waals forces, which relate to the mutual attraction between the solids. In order to overcome these forces of attraction, absorption layers have to be deposited on the solids, e.g., by using surfactants.

During and after dispersion an interaction occurs between the surrounding medium and the solid particle, which results in the desorption of the surfactant and its replacement by the surrounding medium, which is present in a higher concentration. However, in most cases the surrounding medium is not capable of forming stable absorption layers and the whole system breaks down. This is manifested, for example, by an increase in the viscosity of liquid systems and by loss of gloss and color shifts in lacquers and coatings.

There have been many efforts aimed at providing effective dispersants for solids, particularly for pigments, which facilitate the incorporation of solids into solvent-based coating compositions and enable coating compositions to be produce are stable to sedimentation. Dispersing agents of this type are described in EP-A 0,154,678, EP-A 0,205,510 and EP-A 0,335,197, for example.

The dispersing agents described in these publications are based on polyisocyanates having a functionality of ≧2.5. Due to the high functionality, most of these polyisocyanates are highly viscous and can only be produced and made available as dilute solutions containing considerable amounts of organic solvents. These solvents can have a disadvantageous effect on the final product, particularly when the latter is a dispersing agent for aqueous coating compositions. Therefore, the solvents have to be removed by distillation after the production of the dispersing agent, which causes longer production times and higher costs.

It is known in the art that dispersing agents based on polyisocyanates having a functionality of ≦2.5 do not exhibit the desired high efficiency of the dispersing agents described above.

An object of the present invention is to provide a new process for producing highly effective dispersing agents in which low viscosity polyisocyanates are used and organic solvents are not necessary. It is an additional object of the present invention for the dispersing agents to be suitable for dispersing solids, particularly pigments, into aqueous coating compositions.

These objects may be achieved with the dispersing agents according to the invention which are described below and obtained by the process according to the invention.

SUMMARY OF THE INVENTION

The present invention relates to a process for the solvent-free production of polyisocyanate addition products, which are suitable as dispersing agents for incorporating solids into aqueous coating compositions, wherein the polyisocyanate addition products have a maximum content of 1% by weight of isocyanate groups and a content of 30 to 95% by weight of ethylene oxide units (molecular weight=44) present in the polyether chains of monofunctional alcohols B), and are prepared by reacting A) a polyisocyanate component having an average NCO functionality of 1.7 to 2.5 and an NCO content of 10 to 65% by weight with one or more of the following components:

B) 0 to 75 equivalent %, based on the isocyanate groups of A), of a monohydric alcohol component containing one or more monohydric polyether alcohols, which have a number average molecular weight of 150 to 5000 and an ethylene oxide content of 40 to 99.5% by weight, and are produced by the alkoxylation of a monovalent starter molecule, wherein the alkoxylation product may optionally be modified, subsequent to alkoxylation, by an addition reaction with up to 40% by weight, based on the weight of the alkoxylation product, of ε-caprolacton, C) 0 to 75% by weight, based on the isocyanate groups of A), of a monohydric alcohol component containing one or more monohydric alcohols having a number average molecular weight of 32 to 5000, which are different from the alcohols of component B), D) 0 to 35 equivalent %, based on the isocyanate groups of A), of an amine component which contains at least one tertiary amine having a molecular weight of 88 to 250 and which contains one isocyanate-reactive group and E) 0 to 65 equivalent %, based on the isocyanate groups of A), of compounds having a number average molecular weight of 32 to 5000 and at least two isocyanate-reactive groups, at an NCO index of 100 to 600 to form urethane and optionally urea and/or allophanate groups, and optionally simultaneously or subsequently reacting any unreacted isocyanate groups by secondary reactions until the isocyanate group content is ≦1.0% by weight.

The present invention also relates to the polyisocyanate addition products obtained by this process and to their use as dispersing agents incorporating solids into aqueous and/or solvent-containing coating compositions.

DETAILED DESCRIPTION OF THE INVENTION

An important advantage of the present invention is the ability to use commercially available polyisocyanates having low molecular weights, low functionalities and very low viscosities as starting components. The use of organic solvents, which is necessary to reduce the viscosity when higher molecular weight and higher functionality polyisocyanates are used, can be dispensed with. This results in a considerable simplification of the process, because it is not necessary to distill off organic solvent after completion of the reaction. The chemical constitution of the dispersing agents which are obtained according to the invention is different from that of the dispersing agents which are obtained according to the prior art by the use of polyisocyanates having higher functionalities. The dispersing agents which are obtained according to the invention are therefore new chemical compounds.

The polyisocyanate addition products according to the invention constitute reaction products of polyisocyanates A) with starting components B), C), D) and/or E), which contain urethane and optionally allophanate and/or urea groups, and have been freed from excess isocyanate groups by secondary reactions simultaneously with and/or subsequently to the addition reaction which results in the formation of urethane and optionally allophanate and/or urea groups. The molecular weights of these components are number average molecular weights, which may be determined from end group analysis (to determine the hydroxyl group content or the amine group content) and the functionality.

The content of ethylene oxide units (molecular weight=44) in the reaction products according to the invention is 30 to 95, preferably 40 to 95% by weight. The content of free isocyanate groups is less than 1% by weight, preferably free isocyanate groups cannot be detected.

Polyisocyanate component A) has an average NCO functionality of 1.7 to 2.5, preferably 1.8 to 2.4, and an NCO content of 10 to 65, preferably 12 to 60% by weight. Polyisocyanate A) contains one or more organic polyisocyanates. Suitable polyisocyanates include unmodified diisocyanates and modification products of known polyisocyanates, particularly diisocyanates. In addition, polyisocyanate component A) may contain monoisocyanates in an amount of up to 20% by weight. These monoisocyanates may be added to the reaction mixture during or after the reaction of component A) with components B) to E), and then participate in the further course of the reaction in the synthesis of the dispersing agents according to the invention.

Examples of unmodified polyisocyanates which are suitable as component A) include the polyisocyanates of the diphenylmethane series, such as those which are formed, in addition to the corresponding diisocyanates, by phosgenating aniline/formaldehyde condensates.

Preferably, polyisocyanates A) are selected from monomeric polyisocyanates, more preferably diisocyanates or modification products thereof. The modification products are prepared from monomeric polyisocyanates, preferably diisocyanates, and contain biuret, urethane, allophanate, uretdione and/or isocyanurate groups. Examples of suitable include diisocyanates hexamethylene diisocyanate, cyclohexane-1,3- and/or -1,4-diisocyanate, 1-isocyanato-3, 3,5-trimethyl-5-isocyanato-methylcyclohexane, hexahydrotoluene 2,4- and/or 2,6-diisocyanate, perhydro-2,4'- and/or -4,4'-diphenylmethane diisocyanate, toluene 2,4- and/or 2,6-diisocyanate, diphenylmethane 2,4'- and/or -4,4'-diisocyanate and naphthylene 1,5-diisocyanate. Examples of optional monoisocyanates include 1-isocyanatobutane, 1-isocyanatohexane, 1-isocyanatooctadecane, cyclohexyl isocyanate, phenyl isocyanate, isomeric toluene isocyanates, benzyl isocyanate and 1-naphthyl isocyanate.

The commercially available polyisocyanates are particularly preferred for the production of modified diisocyanates, such as 2,4-diisocyanatotoluene mixtures thereof with up to 35% by weight, based on the mixture, of 2,6-diisocyanatotoluene, 4,4'-diisocyanatodiphenyl-methane mixtures thereof with 2,4'- and/or 2,2'-diisocyanatodiphenyl-methane, 1,6-diisocyanatohexane, 1,4-diisocyanatobutane, 1-isocyanato-3,3,5-trimethyl-5-isocyanatomethylcyclohexane, 1-isocyanato-3(4)-isocyanatomethyl-1-methyl-cyclohexane, and mixtures of thereof.

Especially preferred as polyisocyanates A) include monomeric diisocyanates, such as 2,4-diisocyanatotoluene and mixtures thereof with up to 35% by weight, based on the mixture, of 2,6-diisocyanatotoluene. These especially preferred diisocyanates generally have an NCO content of 12 to 60% by weight and an NCO functionality of 2.0.

Polyisocyanate component A) is optionally used in the form of a solution in an inert solvent, such as butyl acetate. However, polyisocyanate component A) is preferably free from solvent.

Monohydric alcohol component B) is selected from one or more monohydric alcohols which has a number average molecular weight of 150 to 5000, preferably 500 to 3000, and contains 40 to 99.5, preferably 44 to 99.5, and more preferably 60 to 99.5% by weight, based on the total weight of monohydric alcohol, of ethylene oxide units incorporated within polyether chains. Examples include the known alkoxylation products of monovalent starter molecules which contain an average of at least 3, preferably 7 to 100, alkylene oxide units of which at least 30, preferably at least 40 and more preferably 60 to 100% by weight, are ethylene oxide units. The monovalent starter molecules used to prepare the monohydric alcohols may be either contain or be free from ether groups.

Monohydic alcohol components B) are optionally addition products of ε-caprolactone (in a ring-opening ester forming reaction) onto the previously prepared alkoxylation products. These modified monohydric alcohols may contain up to 40% by weight of terminal ε-caprolactone units (calculated as $C_6H_{10}O_2$, molecular weight=114).

Monohydric alcohols, phenols and carboxylic acids are preferably used for preparing the monohydric polyether alcohols. The starter molecules contain 1 to 30, preferably 1 to 10 and most preferably 1 to 4 carbon atoms. Examples include alcohols such as methanol, ethanol, n-propanol, n-butanol, 1-pentanol, 1-hexanol, 1-octanol, oleyl alcohol and benzyl alcohol; phenols such as cresols, methyl-phenols, nonylphenols and dodecylphenols; and acids which can be alkoxylated, such as acetic acid, butyric acid, capric acid, lauric acid, palmitic acid, stearic acid and cyclohexane carboxylic acid. Preferred starter molecules are monohydric alcohols containing 1 to 4 carbon atoms.

Ethylene oxide and mixtures of ethylene oxide with up to 60, preferably up to 56 and more preferably up to 40% by weight, based on the total weight of alkylene oxides, of other alkylene oxides, preferably propylene oxide, are preferably used for the known alkoxylation reaction. If other alkylene oxides are also used in addition to ethylene oxide, they may be used in admixture or successively to form random and block copolymers, respectively.

Component B) is used in an amount of 0 to 75, preferably 0 to 65 and more preferably 10 to 50 equivalent %, based on the isocyanate groups of component A).

Component C) is selected from one or more monohydric alcohols having a number average molecular weight of 32 to 5000, which are different from the alcohols of component B). Substances which are particularly suitable include the known monohydric alcohols, such as methanol, ethanol, propanol, isopropanol, 1- and 2-butanol, isobutanol, 1-hexanol and 2-ethyl-1-hexanol; monohydric ester alcohols having a molecular weight of 94 to 350, such as hydroxybutyric acid methyl ester, ethylene glycol monoacetate, 2,2-dimethylhydroxypropionic acid methyl ester, lactic acid propyl ester and co-hydroxycaproic acid ethyl ester; and/or monohydric alcohols having a number average molecular weight of 146 to 2000 which have been obtained by the known addition of ε-caprolactone to the previously described monohydric alcohols.

Mixtures of these monohydric alcohols, "ester alcohols" and/or the monohydric ester alcohols based on caprolactone may also be used. Component C) is used in amount of 0 to 75, preferably 0 to 65 equivalent %, based on the isocyanate groups of component A). More preferably component C) is not used.

Component D) is selected from organic compounds which contain at least one tertiary amino group and an isocyanate-reactive group, preferably a hydroxyl or amino group. These compounds preferably have a molecular weight of 88 to 250, more preferably 88 to 150.

Examples of these compounds include amino alcohols such as N,N-diethyl-ethanolamine, N,N-dimethyl-ethanolamine, N,N-dimethyl-isopropanolamine, N,N-dimethyl-1,3-propanediamine, N,N-diethyl-ethylenediamine, N,N-dibutyl-ethanol-amine, 3-(dimethylamino)-1-propanol, 1-methylpiperazine, 1-methyl-4-piperidinol, 2-morpholinoethanol, 2-piperidinoethanol, 2-piperazinoethanol, 2-piperazinoethylamine, 3-morpholinopropylamine, N,N-dibutyl-trimethylenediamine, 3-(diethylamino)-1-propanol, N-methyl-3-pyrrolidinol, 2-(hydroxymethyl)-N-methyl-piperidine and polyamines which contain at least one tertiary amino group and a primary or secondary amino group. Examples of these compounds, in addition to those disclosed above, include N,N-dimethyl-ethylenediamine, N,N-diethyl-1,4-butanediamine and N-methyl-piperazine.

Preferred compounds for use as component D) include 4-(2-hydroxyethyl)-pyridine, 2-hydroxyethylmorpholine, N,N-dimethyl-1,3-propanediamine, N,N-diethyl-1,4-butanediamine, N,N-dimethyl-ethanolamine and N,N-diethyl-ethanol-amine.

Component D) is used in an amount of 0 to 35, preferably 3 to 30 and more preferably 5 to 25 equivalent % based on the isocyanate groups of component A). Component D) is preferably used in an amount such that 0 to 200, preferably 2 to 200 and more preferably 5 to 100 milliequivalents of tertiary amino groups are present per 100 g of solids in the addition products according to the invention.

Component E) is selected from organic compounds having a molecular weight of 32 to 3000, preferably 62 to 2000, which contain at least two isocyanate-reactive groups, preferably at least two alcoholic hydroxyl groups. Preferred examples include the known polyester and polyether diols and the low molecular weight diols, triols or higher functionality alcohols, such as ethylene glycol, 1,3- and 1,4-butanediol, 1,6-hexanediol, neopentyl glycol, cyclohexane-1,4-dimethanol, 1,2- and 1,3-propanediol, trimethylolpropane, pentaerythritol or sorbitol. Hydrazines or amines containing at least two isocyanate-reactive groups can also be used, as well as mixtures of the preceding compounds.

Component E), if used at all, is used in the production of the addition compounds according to the invention in an amount of up to 65, preferably up to 55 and more preferably up to 50 equivalent %, based on the isocyanate groups of component A).

Different methods can be used for preparing the addition products according to the invention from starting materials A) to E). The reaction is preferably conducted in the melt at temperatures of 0 to 250, preferably 20 to 140° C. Isocyanate component A) may be reacted with a mixture of component B) and optionally C), D) and/or E), or an NCO prepolymer is initially produced from component A) and a portion of reactants B) to E), and is subsequently reacted in a second step with the remainder of the reactants containing isocyanate-reactive groups. The components are reacted at an isocyanate index (i.e., the ratio of isocyanate groups to isocyanate-reactive groups, multiplied by 100) of 100 to 600.

Thereafter, the excess NCO is reduced by secondary reactions down to a maximum content of 1.0% by weight, preferably to a maximum content of 0.5% by weight and more preferably to a maximum content of 0.2% by weight. These secondary reactions include formation of allophanate groups, biuret groups or uretdione groups, or the formation of isocyanurate groups by either addition or polymerization reactions of the excess NCO groups. These secondary reactions are often catalyzed by the tertiary nitrogen atoms which may be present and are carried out by heating for 0.1 to 24 hours at 60 to 250° C. Polymerization reactions in which uretdione groups and/or isocyanurate groups are formed are preferred as secondary reactions.

More preferably, the secondary reaction is the polymerization of the remaining NCO groups to form isocyanurate groups, which is catalyzed by tertiary nitrogen atoms, which may be present from component D) or from the addition of other trimerization catalysts.

All of the compounds which have previously been used for the production of isocyanurate group-containing polyisocyanates are suitable as catalysts for the trimerization of the excess NCO groups. Examples include oxides such as lithium oxide or bis-[tributyltin] oxide; alkanolates such as sodium methanolate or potassium tert.-butanolate; phenolates such as 2-methyl-4-(tetrahydrothiophenylio)-phenoayl; hydrides such as sodium borohydride; hydroxides such as quaternary ammonium, phosphonium, arsonium or stibonium hydroxides or potassium hydroxide/crown ethers; amines such as triethylamine, benzyl-dimethylamine. Mannich bases of phenols, pyrazine or 1-(2-hydroxyethyl)-aziridine; amides such as acrylamide and carbamic acid esters; aminimides such as N,N-dimethyl-N-(2-hydroxypropyl)-laurinimide; phosphanes such as tertiary phosphanes; carboxylates such as sodium formate, potassium acetate or tetraethylammonium-2-ethylhexanoate, borates; organometallic compounds; metal chelates; acids or Lewis acids such as hydrogen chloride or aluminum chloride; Friedel Craft catalysts; and tetramethyl-ammonium dibutyl phosphate.

Also suitable are mixtures such as tetraethylammonium iodide/(phenoxymethyl)-oxirane, 1,4-diaza-bicyclo[2,2,2] octane/(phenoxy-methyl)-oxirane and cyclohexyl-dimethyl amine/tetramethyl ammonium-2-ethylhexanoate. A detailed review of catalysts for the trimerization of isocyanate groups, which contains corresponding references to the original literature, is given in Houben-Weyl, Methoden der organischen Chemie, Volume E, 20 (1987), pages 1741–1751, Georg Thieme Verlag Stuttgart, New York.

Although the process according to the invention is preferably conducted solvent-free, it is possible to use inert solvents, e.g., to reduce the viscosity. Examples of suitable solvents include dimethylformamide, N-methylpyrrolidone, dimethyl-acetamide, acetone, 2-butanone, ethyl acetate, butyl acetate, methoxypropyl acetate, toluene, and mixtures thereof. The solvents are generally removed during or on completion of the reaction, for example, by distillation. The use of solvents is not preferred for the process according to the invention.

Catalysts which speed up the isocyanate addition reaction and which are known in the art may also be used. Examples include triethylamine, N,N-dimethylamine and tin compounds, such as tin(II) octoate or dibutyltin dilaurate.

The polyisocyanate addition products according to the invention constitute dispersants for solids, particularly for pigments or extenders in the production of aqueous coating compositions. For this application the polyisocyanate addition products according to the invention are employed in an amount of 0.1 to 200% by weight, preferably 0.5 to 175% by weight and more preferably 1 to 150% by weight, based on the weight of the solids. These compounds may either be mixed previously with the solids to be dispersed, or may be dissolved in the dispersing medium (water) before or simultaneously with the addition of the solids. Preferably, the polyisocyanate addition products according to the invention are deposited on the solids, by intensive mixing, before the dispersion process.

The dispersants according to the invention are suitable for facilitating the dispersion of any solids, particularly pigments and extenders. Examples include inorganic and organic pigments, as well as carbon black. Examples of suitable inorganic pigments include titanium dioxide, iron oxides or spinels; examples of organic pigments include azo pigments such as pigments of the mono-azo series, acetoacetic ester derivatives, derivatives of 2,3-oxynaphthoic acid, 2,3-oxy-naphthoic acid-arylamide derivatives, pigments of the diazo series, derivatives of 3,3-dichlorobenzidine, anthraquinone pigments, phthalocyanine pigments, polycyclic pigments, particularly those of the anthraquinone, thioindigo, quinacridone, dioxazine, pyrrolo-pyrrole, naphthalene-tetracarboxylic acid, pterylene, isoamido-lin(on)e, flavanthrone, pyranthrone or isoviolanthrone series.

The preferred pigments are β- and γ-crystal modifications of unsubstituted linear quinacridone, mixed crystals of 2,9-dimethyl-quinacridone and unsubstituted quinacridones. More preferably, the dispersing agents according to the invention are suitable for the dispersion of carbon black in aqueous coating compositions.

Examples of extenders which can be dispersed in aqueous coating compositions according to the invention include kaolin, french chalk, other silicates, chalk, glass fibers, glass beads or metal powders.

The previously disclosed solids may be incorporated into any aqueous one-component or two-component coating compositions in accordance with the present invention. Examples of aqueous one-component coating compositions include those based on alkyd, acrylate, epoxy, polyvinyl acetate, polyester or polyurethane resins. Examples of aqueous two-component coating compositions include those based on (i) polyacrylate, polyester, polyurethane, polyester/polyacrylate, polyurethane/polyacrylate or polyester/polyurethane resins which contain hydroxyl groups, and (ii) melamine resins, polyisocyanates or blocked polyisocyanates as crosslinking agents. Aqueous coating compositions based on polyepoxy resins are also suitable.

The polyisocyanate addition products according to the invention can also be used as wetting agents or dispersants for the incorporation of solids, particularly pigments, in plastics formulations.

The invention is further illustrated but is not intended to be limited by the following examples in which all parts and percentages are by weight unless otherwise specified.

EXAMPLES component A1): toluene 2,4-dusocyanate (Desmodur T 100, available from Bayer AG)

component A2): 4,4'-diphenylmethane diisocyanate (Desmodur 44, available from Bayer AG)

component B: a monohydric polyether alcohol having a number average molecular weight of 2250 and an ethylene oxide content of 87.5% by weight, produced by the alkoxylation of n-butanol using a mixture of ethylene oxide and propylene oxide.

component D: N,N-dimethylethanolamine component E): 1,1,1-tris-(hydroxymethyl)-propane (trimethylolpropane)

Example 1

According to the Invention 202.5 g of component B) were placed in a 1 liter three-necked flask fitted with a stirrer, reflux condenser and thermometer and were dehydrated for 2 hours at 120° C. and at a pressure of 10 mbar. The batch was then cooled to 25° C., and 15.66 g of component A1) and 1.34 g of component E) were added. The batch was heated to 80° C. and stirred until an NCO content of about 1.2% was reached. 4.0 g of component D) were then added and the batch was stirred until NCO bands were no longer visible in the IR spectrum. A water soluble polyisocyanate addition product was obtained which could be used for the dispersion of pigments or for the dispersion and surface treatment of extenders.

Example 2

According to the Invention

A water soluble polyisocyanate addition product was prepared following the procedure of Example 1, except that 22.5 g of component A2) were used instead of component A1).

Example 3

According to the Invention 200.0 g of component B) were placed in the apparatus described in Example 1 and dehydrated. 33.78 g of component A1) were then added at 80° C., and the batch was stirred at 80° C. until an NCO content of about 5.4% was reached. 3.96 g of component D) were added and the batch was stirred for 20 minutes at 80° C. 0.2 g of 2,4,6-tris-(dimethylaminomethyl)-phenol were then added and the batch was stirred at 80° C. until NCO bands were no longer visible in the IR spectrum. A water soluble, isocyanurate group-containing, polyisocyanate addition product was obtained, which was suitable for the dispersion of pigments or for the dispersion and surface treatment of extenders.

Example 4

According to the Invention

A water soluble polyisocyanate addition product was prepared following the procedure of Example 3, except that the addition of 2,4,6-tris-(dimethyl-aminoethyl)-phenol was omitted and the batch was stirred until NCO bands were no longer visible in the IR spectrum. The time of reaction was about 10% longer than that for the product according to Example 3.

Example 5

According to the Invention 39.2 g of component A1) were placed in the apparatus described in Example 1 under a nitrogen atmosphere and heated to 40° C. 0.12 g of 2,4,6-tris-(dimethylaminomethyl)-phenol were then added. The batch was stirred at 40° C. until an NCO content of about 33% was reached. The functionality of the resulting polyisocyanate mixture was 2.36. 202.5 g of component B) were then added, and the batch was heated to 80° C. and stirred until an NCO content of about 1.4% was reached. 4.0 g of component D) were then added and the batch was stirred at 80° C. until NCO bands were no longer visible in the IR spectrum. A water soluble, isocyanurate group-containing, polyisocyanate addition product was obtained, which was suitable for the dispersion of pigments or for the dispersion and surface treatment of extenders.

Example 6

Not According to the Invention 292.5 g of component B) were placed in the apparatus described in Example 1 and dehydrated. 105.0 g of a 51% solution in butyl acetate of an isocyanurate group-containing polyisocyanate prepared from 2,4-diisocyanatotoluene and having an NCO content, based on the weight of the solution, of 8.0% and a functionality of >3 (Desmodur® IL, available from Bayer AG) was added at 80° C., and the batch was stirred until the NCO content was about 0.75%. 5.4 g of component D) were then added and the batch was stirred at 80° C. until NCO bands were no longer visible in the IR spectrum. Thereafter, a distillation arrangement was fitted, and the solvent was distilled off at a temperature of 80 to 100° C. and at a pressure of 10 mbar. A solvent-free, water soluble polyisocyanate addition product was obtained, which was suitable for the dispersion of pigments or for the dispersion and surface treatment of extenders. A comparison of the IR spectra of the dispersing agents from Examples 3 and 5 showed distinct differences, so that it was apparent that these substances were chemically different. Compared with the process according to Example 5, the process according to the invention has the advantage that it can be operated free from solvent such that a distillation step is unnecessary.

Examples 7 to 11

Use

Preparation of wetting agent solutions:

The water soluble polyisocyanate addition products from Examples 1 to 6 were dissolved in water by heating to 65 to 70° C., and were adjusted to a solids content of 40%. Clear solutions were obtained which could be used as wetting agents for the production of aqueous coating compositions.

Preparation of pigment pastes:

15.0 g of black pigment (Farbruβ FW 200, available from Degussa), 0.2 g of an anti-foaming agent (Nopco 8034 E, available from Muinzing Chemie), 0.7 g of propylene glycol, 28.6 g of wetting agent and 150 g of glass beads (diameter=3 mm) were introduced into a 300 ml round glass bottle and dispersed by shaking in a commercially available dispersing device for 90 minutes. The glass beads were subsequently filtered off.

Preparation of coating composition, application and assessment:

5.0 g of pigment paste, 0.3 g of an antioxidant (concentrated Ascinin R, available from Bayer AG), 45.0 g of aqueous alkyd resin (Resydrol AY 586W, available from Hoechst AG), and 0.3 g of a desiccant (Octa Soligen Co 7 aqua, available from Borchers GmbH) were homogenized under 20 g of glass beads (diameter=3 mm) in a round glass bottle for 30 minutes in a dispersing device. The glass beads were subsequently filtered off. After a maturation period of about 12 hours, films having a wet film thickness of 100 μm were applied to degreased glass plates. The haze gloss and the Gardner gloss (20° angle) were measured according to DIN 67530, ISO 2813, ASTM D 523 after storage for one day at room temperature. The results of the measurements are set forth in Table 1.

TABLE 1

| Example | Coating based on polyisocyanate addition product from Example | 20° gloss | Haze gloss |
|---|---|---|---|
| 7 | 1 | 81.0 | 12.1 |
| 8 | 2 | 80.7 | 9.6 |
| 9 | 3 | 81.0 | 10.0 |
| 10 | 4 | 81.3 | 11.9 |
| 11 | 5 | 82.0 | 11.0 |
| Comparison 1 | 6 | 80.5 | 12.9 |
| Comparison 2 | Solvent-containing wetting and dispersing agent from EP-A 0,154,678 (U.S. Pat. 4,647,647) | 80.9 | 30.7 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the solvent-free production of a polyisocyanate addition product, which is suitable as a dispersing agent for incorporating solids into aqueous coating compositions, wherein the polyisocyanate addition product has a maximum content of 1.0% by weight of isocyanate groups and a content of 30 to 95% by weight of ethylene oxide units (molecular weight =44) present in the polyether chains of monofunctional alcohol B), which comprises reacting A) a polyisocyanate component having an average NCO functionality of 1.7 to 2.5 and an NCO content of 10 to 65% by weight with one or more of the following components:

B) an amount up to 75 equivalent %, based on the isocyanate groups of A), which is sufficient to obtain said content of ethylene oxide units, of a monohydric alcohol component containing one or more monohydric polyether alcohols, which have a number average molecular weight of 150 to 5000 and an ethylene oxide content of 40 to 99.5% by weight, and are produced by the alkoxylation of a monovalent starter molecule, wherein the alkoxylation product may optionally be modified, subsequent to alkoxylation, by an addition reaction with up to 40% by weight, based on the weight of the alkoxylation product, of ε-caprolactam, C) 0 to 75% by weight, based on the isocyanate groups of A), of a monohydric alcohol component containing one or more monohydric alcohols having a number average molecular weight of 32 to 5000, which are different from the alcohols of component B), D) 0 to 35 equivalent %, based on the isocyanate groups of A), of an amine component which contains at least one tertiary amine having a molecular weight of 88 to 250 and which contains one isocyanate-reactive group and E) 0 to 65 equivalent %, based on the isocyanate groups of A), of a compound having a number average molecular weight of 32 to 5000 and at least two isocyanate-reactive groups, at an NCO index of 100 to 600 to form urethane and optionally urea groups, and simultaneously or subsequently reacting any unreacted isocyanate groups by a secondary reaction until the isocyanate group content is $\leq 1.0\%$ by weight, wherein said secondary reaction is a trimerization reaction and is not optional.

2. A process for the solvent-free production of a polyisocyanate addition product, which is suitable as a dispersing agent for incorporating solids into aqueous coating compositions, wherein the polyisocyanate addition product has a maximum content of 1.0% by weight of isocyanate groups and a content of 30 to 95% by weight of ethylene oxide units (molecular weight =44) present in the polyether chains of monofunctional alcohol B), which comprises reacting A) a polyisocyanate component having an average NCO functionality of 1.7 to 2.5 and an NCO content of 10 to 65% by weight with one or more of the following components:

B) an amount of up to 75 equivalent %, based on the isocyanate groups of A), which is sufficient to obtain said content of ethylene oxide units, of a monohydric alcohol component containing one or more monohydric polyether alcohols, which have a number average molecular weight of 150 to 5000 and an ethylene oxide content of 40 to 99.5% by weight, and are produced by the alkoxylation of a monovalent starter molecule, wherein the alkoxylation product may optionally be modified, subsequent to alkoxylation, by an addition reaction with up to 40% by weight, based on the weight of the alkoxylation product, of ε-caprolactam, C) 0 to 75% by weight, based on the isocyanate groups of A), of a monohydric alcohol component containing one or more monohydric alcohols having a number average molecular weight of 32 to 5000, which are different from the alcohols of component B), D) 0 to 35 equivalent %, based on the isocyanate groups of A), of an amine component which contains at least one tertiary amine having a molecular weight of 88 to 250 and which contains one isocyanate-reactive group and E) 0 to 65 equivalent %, based on the isocyanate groups of A), of a compound having a number average molecular weight of 32 to 5000 and at least two isocyanate-reactive groups, at an NCO index of 100 to 600 to form urethane and optionally urea groups, and simultaneously or subsequently reacting any unreacted isocyanate groups by a secondary reaction until the isocyanate group content is $\leq 1.0\%$ by weight, wherein said secondary reaction is an isocyanate addition reaction, and is not optional.

3. A process for the solvent-free production of a polyisocyanate addition product, which is suitable as a dispersing agent for incorporating solids into aqueous coating compositions, wherein the polyisocyanate addition product has a maximum content of 1.0% by weight of isocyanate groups and a content of 30 to 95% by weight of ethylene oxide units (molecular weight =44) present in the polyether chains of monofunctional alcohol B), which comprises reacting A) a polyisocyanate component having an average NCO functionality of 1.7 to 2.5 and an NCO content of 10 to 65% by weight with one or more of the following components:

B) an amount up to 75 equivalent %, based on the isocyanate groups of A), which is sufficient to obtain said content of ethylene oxide units, of a monohydric alcohol component containing one or more monohydric polyether alcohols, which have a number average molecular weight of 150 to 5000 and an ethylene oxide content of 40 to 99.5% by weight, and are produced by the alkoxylation of a monovalent starter molecule, wherein the alkoxylation product may optionally be modified, subsequent to alkoxylation, by an addition reaction with up to 40% by weight, based on the weight of the alkoxylation product, of ε-caprolactam, C) 0 to 75% by weight, based on the isocyanate groups of A), of a monohydric alcohol component containing one or more monohydric alcohols having a number average molecular weight of 32 to 5000, which are different from the alcohols of component B), D) 0 to 35 equivalent %, based on the isocyanate groups of A), of an amine component which contains at least one tertiary amine having a molecular weight of 88 to 250 and which contains one isocyanate-reactive group and E) 0 to 65 equivalent %, based on the isocyanate groups of A), of a compound having a number average molecular weight of 32 to 5000 and at least two isocyanate-reactive groups, at an NCO index of 100 to 600 to form urethane and optionally urea groups, and simultaneously or subsequently reacting any unreacted isocyanate groups by a secondary reaction until the isocyanate group content is $\leq 1.0\%$ by weight, wherein said secondary reaction is a dimerization reaction, and is not optional.

* * * * *